(12) United States Patent
Guo et al.

(10) Patent No.: US 11,821,800 B2
(45) Date of Patent: Nov. 21, 2023

(54) SENSOR FOR MEASURING CAM AND TAPPET CONTACT FORCE OF ENGINE AND MEASURING METHOD

(71) Applicant: Harbin Engineering University, Harbin (CN)

(72) Inventors: Jie Guo, Harbin (CN); Shengwei Zhou, Harbin (CN); Guoan Jiang, Harbin (CN); Xinyu Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 17/659,582

(22) Filed: Apr. 18, 2022

(65) Prior Publication Data

US 2023/0110677 A1 Apr. 13, 2023

(30) Foreign Application Priority Data

Oct. 8, 2021 (CN) .......................... 202111169650.5

(51) Int. Cl.
*G01L 1/16* (2006.01)
*F01L 1/14* (2006.01)

(52) U.S. Cl.
CPC ................ *G01L 1/16* (2013.01); *F01L 1/146* (2013.01); *F01L 2820/04* (2013.01)

(58) Field of Classification Search
CPC .............. G01N 3/56; F02M 2041/1494; F01L 2820/041–042; F01L 2813/11; F01L 1/14; G01L 5/167; G01M 15/02
See application file for complete search history.

(56) References Cited

U.S. PATENT DOCUMENTS

| 2,263,801 A | * | 11/1941 | Graham | F01L 1/24 73/114.79 |
| 2,619,834 A | * | 12/1952 | Kelly | F01L 1/24 73/114.79 |
| 2,910,864 A | * | 11/1959 | Simmons | G01M 3/2876 73/114.79 |
| 4,294,109 A | * | 10/1981 | Peters | G01M 13/003 73/168 |
| 4,366,785 A | * | 1/1983 | Goloff | F01L 1/14 29/888.43 |
| 4,408,580 A | * | 10/1983 | Kosuda | F01L 1/245 123/90.55 |
| 4,693,214 A | * | 9/1987 | Titolo | F01L 1/143 123/90.27 |
| 4,724,802 A | * | 2/1988 | Ishii | F01L 1/181 123/90.39 |

(Continued)

FOREIGN PATENT DOCUMENTS

CN 105910811 A * 8/2016

*Primary Examiner* — Tran M. Tran
(74) *Attorney, Agent, or Firm* — Fox Rothschild LLP

(57) ABSTRACT

The present disclosure provides a sensor for measuring cam and tappet contact force of an engine and a measuring method. The sensor comprises a force carrying element, a force transmission element, a piezoelectric element, a force bearing element, a tappet head and a guide woodruff key. Meanwhile, the present disclosure also provides a measuring method by using the sensor. The sensor is simple in mechanism and convenient to use and can realize the measurement of the cam tappet contact force in the normal direction, the tangential direction and the axial direction of the contact surface.

13 Claims, 2 Drawing Sheets

(56) References Cited

U.S. PATENT DOCUMENTS

| | | | | |
|---|---|---|---|---|
| 4,724,822 A * | 2/1988 | Bonvallet | F01L 13/0005 | 123/90.46 |
| 4,909,197 A * | 3/1990 | Perr | F02M 59/102 | 123/90.39 |
| 5,060,607 A * | 10/1991 | Taniguchi | F01L 1/16 | 123/90.51 |
| 5,199,393 A * | 4/1993 | Baldassini | F01L 1/356 | 123/90.31 |
| 5,293,776 A * | 3/1994 | Takegami | G01M 15/06 | 73/114.27 |
| 5,993,978 A * | 11/1999 | Kim | F01L 1/14 | 428/553 |
| 6,167,856 B1 * | 1/2001 | Rao | F01L 1/042 | 123/90.6 |
| 6,293,303 B1 * | 9/2001 | Mori | F01L 1/46 | 340/870.37 |
| 6,536,389 B1 * | 3/2003 | Shelby | F01L 1/46 | 123/90.15 |
| 6,647,770 B2 * | 11/2003 | Satish | F16K 49/002 | 73/114.79 |
| 7,028,654 B2 * | 4/2006 | Mandal | F01L 1/24 | 123/90.48 |
| 7,272,969 B2 * | 9/2007 | Shinohara | G01N 3/56 | 73/7 |
| 7,353,698 B2 * | 4/2008 | Rutschmann | F02B 77/085 | 73/114.04 |
| 7,658,173 B2 * | 2/2010 | Carroll | F01L 1/14 | 123/90.51 |
| 8,201,532 B2 * | 6/2012 | Prokop | F01L 1/143 | 123/90.5 |
| 9,970,362 B2 * | 5/2018 | Jung | F01L 1/047 | |
| 10,087,789 B2 * | 10/2018 | Guillaume | F02M 59/102 | |
| 11,085,338 B2 * | 8/2021 | VanDeusen | F01L 1/185 | |
| 2008/0076683 A1 * | 3/2008 | Okamoto | C23C 14/0605 | 427/524 |
| 2008/0168823 A1 * | 7/2008 | Maassen | G01N 3/56 | 73/7 |
| 2010/0236319 A1 * | 9/2010 | Penman | F16K 37/0083 | 73/1.72 |
| 2012/0073534 A1 * | 3/2012 | Tanaka | F01L 1/143 | 123/90.48 |

\* cited by examiner

SENSOR FOR MEASURING CAM AND TAPPET CONTACT FORCE OF ENGINE AND MEASURING METHOD

CROSS REFERENCE TO RELATED APPLICATION(S)

This patent application claims the benefit and priority of Chinese Patent Application No. 202111169650.5, filed on Oct. 8, 2021, the disclosure of which is incorporated by reference herein in its entirety as part of the present application.

TECHNICAL FIELD

The present disclosure relates to a sensor for measuring cam and tappet contact force of an engine and a measuring method, and belongs to the technical field of engine performance detection.

BACKGROUND ART

The internal combustion engine is regarded as heat energy power equipment with the largest using amount and the widest application, is widely applied to industry, agriculture, transportation and national defense construction, and is the main power of devices such as automobiles, ships, engineering machinery and standby power stations. The vibration and noise of the internal combustion engine cannot be well controlled, so that the working efficiency of the internal combustion engine is influenced, and related power equipment cannot work normally. The valve mechanism is one of important vibration and noise sources of the internal combustion engine, and the working performance of the valve mechanism directly affects the stability, reliability and service life of the internal combustion engine. The device plays a main role in timely opening and closing an inlet valve and an outlet valve according to an ignition sequence between cylinders and a working process in the cylinders, so that the intake of fresh air in the inlet stroke and the discharge of exhaust gas in an exhaust stroke are guaranteed, and the air exchange process of the internal combustion engine is realized. A certain valve gap exists between transmission parts of the valve mechanism, in the opening and closing process of the valve, impact is generated at the contact positions of the transmission parts, on one hand, the elastic part is excited to generate vibration through impact, and on the other hand, impact noise is directly generated; and when the valve is seated, the valve knocks the valve seat, and seating noise is generated, which is the reason for the vibration and noise of the valve mechanism. Along with continuous improvement of the performance of the internal combustion engine, excitation force borne by all parts of the valve mechanism and abrasion between the parts are aggravated, the overall vibration and noise level of the system is also improved, and in order to guarantee good working performance and high service life of the internal combustion engine, higher requirements are provided for low-noise design of the valve mechanism.

The cam and tappet contact force is one of the main force sources causing vibration and noise of the valve mechanism of the internal combustion engine and is also an important performance index in the cam profile optimization design and valve mechanism performance check, the simulation calculation technology about the cam and tappet contact force is gradually mature, test verification and test analysis are indispensable steps in related research of the valve mechanism, and in the two aspects, direct measurement of the cam and tappet contact force is still a big problem due to the fact that the working space between the cam shaft and the tappet is narrow, and conventional measurement means such as strain gauges are difficult to arrange on the tappet. The motion condition between the cam shaft and the tappet is relatively complex, the tappet performs up-and-down reciprocating motion in the machine body, the tappet also rotates to a certain degree, the magnitude and the direction of contact force between the cam shaft and the tappet are changed all the time, and the factors bring great difficulty to measurement; and most researchers adopt sensors to be arranged on other transmission parts of other gas distribution parts, and the contact force between the cam and the tappet is indirectly calculated through the stress relation.

SUMMARY

In order to overcome the difficulty in measuring the cam and tappet contact force, the present disclosure aims to provide a sensor for measuring cam and tappet contact force of an engine and a measuring method.

The purpose of the present disclosure is realized as follows: the sensor for measuring cam and tappet contact force of an engine comprises a force carrying element, a force transmission element, a piezoelectric element, a force bearing element and a tappet head which are sequentially arranged from bottom to top, wherein the force carrying element is connected with the force transmission element, the force transmission element is connected with the force bearing element and the tappet head, the piezoelectric element is arranged between the force bearing element and the force transmission element, a large arc-shaped groove, a small hemispherical groove and three wire outlet holes are formed in the upper portion of the tappet head, a key groove is formed in the side face of the tappet head, a guide woodruff key is arranged in the key groove, and the guide woodruff key is connected with a tappet guide cylinder.

Further, the small hemispherical groove in the tappet head is designed at the lowest point of the large arc-shaped groove, four countersunk holes which are uniformly distributed at intervals in the circumferential direction are designed in the large arc-shaped groove, and the three wire outlet holes are uniformly formed in the position, close to the inner wall, of the upper end face of the tappet head at the interval of 20 degrees.

Further, a force transmission threaded hole is formed in one end face of the force carrying element; and one end face of the force transmission element is provided with a force transmission bolt which is matched with the force transmission threaded hole of the force carrying element.

Further, four threaded holes are uniformly formed at intervals in the other end face of the force transmission element in the circumferential direction; the piezoelectric element is an annular sensitive element made of piezoelectric crystals; and four through holes which are uniformly distributed at intervals in the circumferential direction are formed in the force bearing element, and four countersunk bolts are connected with the tappet head, the force bearing element and the force transmission element through the countersunk holes, the through holes and the threaded holes.

Further, leads connected with the piezoelectric element are led out through the wire outlet holes and are connected with an external data acquisition and processing system.

Further, the data acquisition and processing system comprises a charge amplifier and a data acquisition instrument.

Further, a method for measuring cam and tappet contact force of an engine by using a sensor, comprising the following steps:

step one, dismantling a tested tappet;

step two, installing the sensor in a tappet guide cylinder, and installing a guide woodruff key to prevent the sensor from rotating;

step three, installing a push rod between the sensor and a rocker arm, and placing a ball head of the push rod in a small hemispherical groove in the head of the push rod of the sensor;

step four, connecting leads, and setting parameters of a data acquisition and processing system; and step five, starting a reversed towing motor, adjusting the different rotating speeds of the reversed towing motor, and transmitting load to the sensor by a cam, wherein charges are generated on the surface of the piezoelectric element after the piezoelectric element is subjected to impact force, and the charges become voltage proportional to external force to be output after amplification of a charge amplifier and impedance change of a measuring circuit, so that the magnitude of the cam and tappet contact force in the normal direction, the tangential direction and the axial direction of the contact surface is obtained.

Compared with the prior art, the sensor has the beneficial effects that in order to overcome the difficulty in directly measuring cam and tappet contact force, researchers design the tappet sensor which is in a special shape and based on the piezoelectric effect based on the design principle of an internal combustion engine. The magnitude and direction of stress of a tappet are measured in the process that the reversed towing motor drives a cam shaft to work, the original tappet is replaced to be matched with the cam shaft, transmission to the push rod and the rocker arm is achieved, and due to the fact that arrangement and wiring of the tappet do not interfere with other parts of the internal combustion engine, normal work of a valve mechanism is not affected.

The sensor is simple in structure and convenient to use, and the real working condition of engine cam-tappet-push rod is restored to the maximum extent in the measuring process, so that the measuring result is more real and more convincing.

Figure 1:
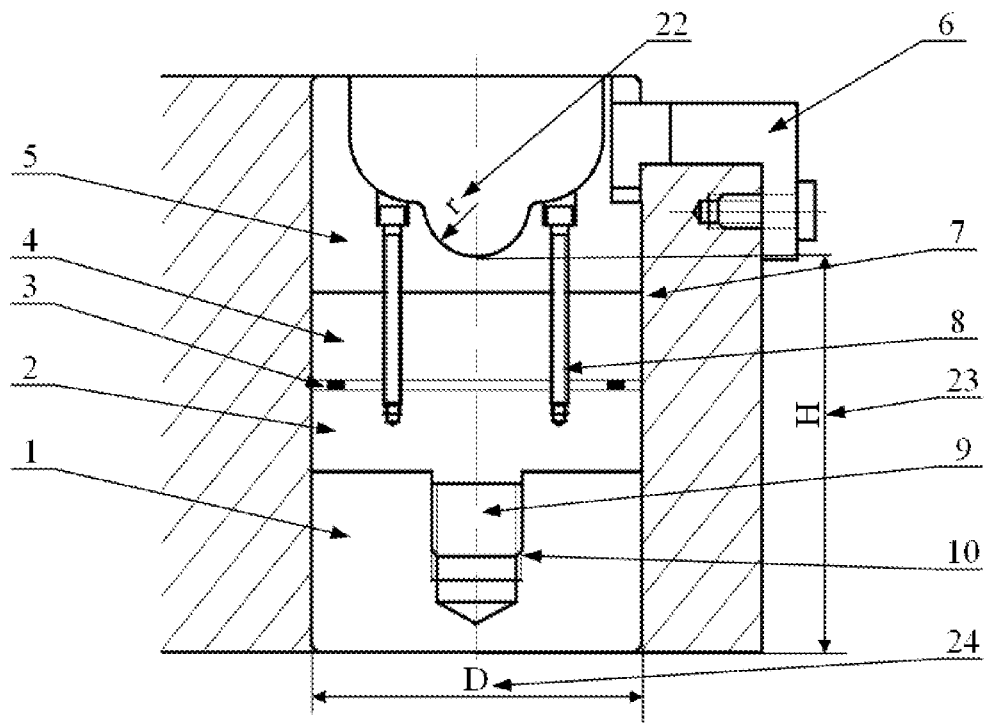
FIG. 1 is a structural schematic diagram of a sensor in the present disclosure.

Reference signs: 1, force carrying element; 2, force transmission element; 3, piezoelectric element; 4, force bearing element; 5, tappet head; 6, guide woodruff key; 7, tappet guide cylinder; 8, countersunk bolt; 9, force transmission bolt; 10, force transmission threaded hole; 11, wire outlet hole; 12, countersunk threaded hole; 13, large arc-shaped groove; 14, small hemispherical groove; 15, key groove; 16, cam shaft; 17, cam; 18, sensor; 19, push rod; 20, lead; 21, data acquisition and processing system; 22, small hemispherical groove semidiameter r; 23, sensor height H; and 24, sensor diameter D.

DETAILED DESCRIPTION OF THE EMBODIMENTS

The present disclosure is further described in detail in conjunction with the attached figures and embodiments.

A sensor for measuring cam and tappet contact force of an engine comprises a force carrying element, a force transmission element, a piezoelectric element, a force bearing element, a tappet head and a guide woodruff key, wherein a force transmission threaded hole is formed in one end face of the force carrying element; one end face of the force transmission element is provided with a force transmission bolt which is matched with the force transmission threaded hole of the force carrying element, and four threaded holes are uniformly formed at intervals in the other end face of the force transmission element in the circumferential direction; the piezoelectric element is an annular sensitive element made of piezoelectric crystals; four through holes which are uniformly distributed at intervals in the circumferential direction are formed in the force bearing element; the tappet head comprises a large arc-shaped groove, a small hemispherical groove, three wire outlet holes and a key groove; the overall geometric dimensions of the sensor are kept consistent with those of the measured tappet, and comprise the sensor diameter, the sensor height and the small hemispherical groove semidiameter; and the piezoelectric element can be used for measuring the magnitude of the cam and tappet contact force in the normal direction, the tangential direction and the axial direction of the contact surface respectively.

The small hemispherical groove in the tappet head is designed at the lowest point of the large arc-shaped groove, four countersunk holes which are uniformly distributed at intervals in the circumferential direction are designed in the large arc-shaped groove, and meanwhile, the three wire outlet holes are uniformly formed in the position, close to the inner wall, of the upper end face of the tappet head at the interval of 20 degrees. The key groove is formed in the outer wall of the tappet head. Leads connected with the piezoelectric element are led out through the wire outlet holes and are connected with an external data acquisition and processing system, and the external data acquisition and processing system comprises a charge amplifier and a data acquisition instrument. One end of the guide woodruff key is installed on a tappet guide cylinder, and the other end of the guide woodruff key is in clearance fit with the key groove in the outer wall of the tappet head.

The second purpose of the present disclosure is realized through the following technical scheme:

A method for measuring cam and tappet contact force by using a sensor comprises the following steps:

step one, dismantling a tested tappet;

step two, installing the sensor in a tappet guide cylinder, and installing a guide woodruff key to prevent the sensor from rotating;

step three, installing a push rod between the sensor and a rocker arm, and placing a ball head of the push rod in a small hemispherical groove in the head of the push rod of the sensor;

step four, connecting a lead, and setting parameters of a data acquisition and processing system; and step five, starting a reversed towing motor, adjusting the different rotating speeds of the reversed towing motor, and transmitting load to the sensor by a cam, wherein charges are generated on the surface of the piezoelectric element after the piezoelectric element is subjected to impact force, and the charges become voltage proportional to external force to be output after amplification of a charge amplifier and impedance change of a measuring circuit, so that the magnitude of the cam and tappet contact force in the normal direction, the tangential direction and the axial direction of the contact surface is obtained.

Figure 2:
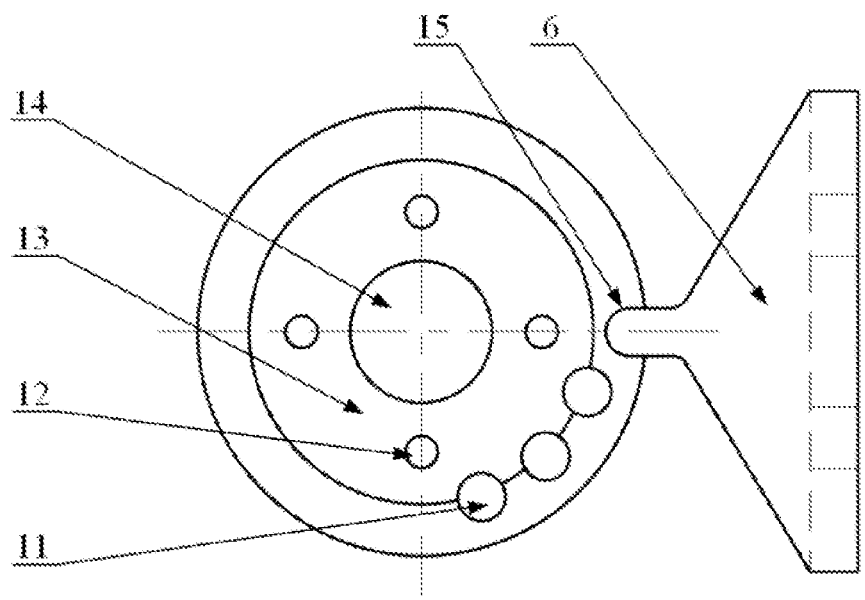
FIG. 2 is a structural top view of a sensor as shown in FIG. 1.
Figure 3:
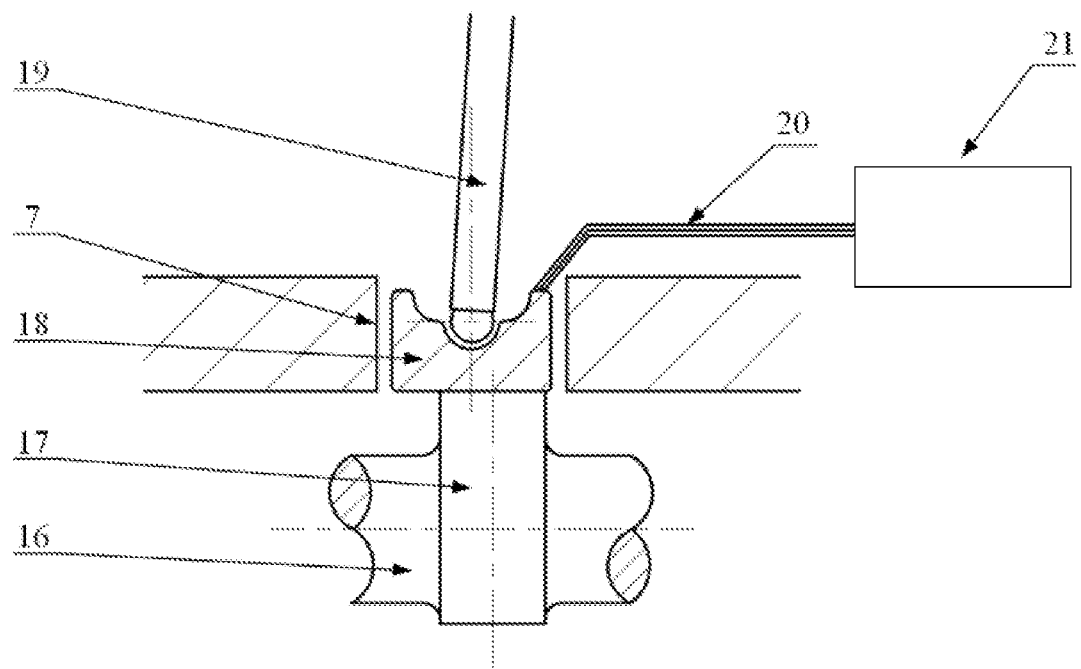
FIG. 3 is an installation diagram of a tappet guide cylinder, on an engine body, of a sensor as shown in FIG. 1.

The embodiment of the present disclosure is given in conjunction with the attached figures of the description as follows:

Referring to FIG. 1, FIG. 2 and FIG. 3, a sensor for measuring cam and tappet contact force of an engine in the present disclosure comprises a force carrying element 1, a force transmission element 2, a piezoelectric element 3, a force bearing element 4, a tappet head 5, guide woodruff key 6, a tappet guide cylinder 7, countersunk bolts 8, force transmission bolts 9, force transmission threaded hole 10, wire outlet holes 11, countersunk threaded holes 12, a large arc-shaped groove 13, a small hemispherical groove 14, a key groove 15 and leads 20.

The sensor is a piezoelectric force sensor based on a piezoelectric effect. The sensor is suitable for, but not limited to, the engine, generally adopted as shown in FIG. 3, that an underneath type cylindrical cam shaft is matched with a cylindrical plane tappet. In FIG. 3, the sensor 18 replaces the measured tappet, a ball head of a push rod 19 is installed in the small hemispherical groove 14 of the tappet head 5, and the rotational motion of the cam shaft 16 is converted into the up-and-down reciprocating motion of the sensor 18, and at the moment, the sensor 18 is subjected to the normal force, the tangential force and the axial force of the contact surface.

Due to work and assembly requirements of parts of the engine, a certain amount of offset exists between the center line of a cam 17 and the center line of the sensor 18, so that the rotational motion of the cam shaft 16 generates a torque for forcing the sensor 18 to rotate around the center line of the cam shaft 16 on the end face, in contact with the sensor 18, of the cam shaft 16, and therefore the sensor 18 generates tiny rotation in the tappet guide cylinder 7. In the process of using the sensor 18, the autorotation phenomenon of the sensor 18 is avoided, therefore, a key groove 15 is formed in the outer wall of the tappet head 5 and has two functions, firstly, the key groove 15 is in clearance fit with the guide woodruff key 6 installed on the tappet guide cylinder 7, and the phenomenon that the leads 20 are entangled with the push rod 19 to be broken due to the fact that the sensor 18 rotates in the working process is prevented; and secondly, the key groove 15 is also used as a reference for measuring the normal force, the tangential force and the axial force of the contact surface, and can also play a role in positioning in the installation process. In addition, in order to ensure that the leads 20 do not interfere with other transmission parts of a valve mechanism, the three leads 20 are led out through the three wire outlet holes 11 respectively to be connected with an external data acquisition and processing system 21.

The overall geometric dimensions of the sensor 18 are kept consistent with those of the measured tappet, and comprise the small hemispherical groove semidiameter 22, the sensor diameter 23 and the sensor height 24;

the force transmission element 2 is connected with the force carrying element 1 through the force transmission bolts 9 and force transmission threaded holes 10; and the force transmission element 2, the piezoelectric element 3, the force bearing element 4 and the tappet head 5 are connected through countersunk bolts 8 and countersunk threaded holes 12.

The data acquisition and processing system 21 comprises a charge amplifier and a data acquisition instrument. Charges are generated on the surface of the piezoelectric element 3 after the piezoelectric element 3 is subjected to impact load of a valve, and the charges become voltage proportional to external force to be output after amplification of a charge amplifier and impedance change of a measuring circuit, so that the magnitude of the cam and tappet contact force in the normal direction, the tangential direction and the axial direction of the contact surface is obtained.

A measuring method in the present disclosure, using the sensor, comprises the following operation steps:

step one, dismantling a tested tappet;

step two, installing the sensor 18 in a tappet guide cylinder, and installing a guide woodruff key 6 to prevent the sensor 18 from rotating;

step three, installing a push rod 19 between the sensor 18 and a rocker arm, and placing a ball head part of the push rod 19 in a small hemispherical groove 14 in a tappet head 5 of the sensor 18;

step four, connecting leads, and setting parameters of a data acquisition and processing system 21; and step five, starting a reversed towing motor, adjusting the different rotating speeds of the reversed towing motor, and transmitting load to the sensor 18 by a cam 17, wherein charges are generated on the surface of the piezoelectric element 3 after the piezoelectric element 3 is subjected to impact force, and the charges become voltage proportional to external force to be output after amplification of a charge amplifier and impedance change of a measuring circuit, so that the magnitude of the cam and tappet contact force in the normal direction, the tangential direction and the axial direction of the contact surface is obtained.

In conclusion, disclosed are a sensor for measuring cam and tappet contact force of an engine and a measuring method. The sensor comprises a force carrying element, a force transmission element, a piezoelectric element, a force bearing element, a tappet head and a guide woodruff key, wherein a force transmission threaded hole is formed in one end face of the force carrying element; one end face of the force transmission element is provided with a force transmission bolt which is matched with the force transmission threaded hole of the force carrying element, and four threaded holes are uniformly formed at intervals in the other end face of the force transmission element in the circumferential direction; the piezoelectric element is an annular sensitive element made of piezoelectric crystals; four through holes which are uniformly distributed at intervals in the circumferential direction are formed in the force bearing element; the tappet head comprises a large arc-shaped groove, a small hemispherical groove, three wire outlet holes and a key groove; charges are generated on the surface of the piezoelectric element after the piezoelectric element is subjected to stress, and the charges become voltage proportional to external force to be output after change of the data acquisition and processing system, so that the magnitude of the cam and tappet contact force in the normal direction, the tangential direction and the axial direction of the contact surface is obtained, and the data acquisition and processing system comprises a charge amplifier and a data acquisition instrument; and the overall geometric dimensions of the sensor are kept consistent with those of the measured tappet, and comprise the sensor diameter, the sensor height and the small hemispherical groove semidiameter. Meanwhile, the present disclosure also provides a measuring method by using the sensor, and the sensor is simple in mechanism, convenient to use and capable of measuring the cam and tappet contact force in the normal direction, the tangential direction and the axial direction of the contact surface.

What is claimed is:

1. A sensor for measuring cam and tappet contact force of an engine, the sensor being configured to be slidable in a tappet guide cylinder, comprising a force carrying element, a force transmission element, a piezoelectric element, a force bearing element and a tappet head which are sequentially arranged from bottom to top, wherein the force carrying element is connected with the force transmission element, the force transmission element is connected with the force bearing element and the tappet head, the piezoelectric element is arranged between the force bearing element and the force transmission element, wherein the sensor is configured to be contacted with a cam and receive load transmitted by the cam, the piezoelectric element is configured to generate charges on the surface thereof after being subjected to an impact force and thereby to obtain the cam and tappet contact force, and wherein the tappet head has a generally cylindrical shape, a large arc-shaped groove, a small hemispherical groove and three wire outlet holes are formed in an upper portion of the cylindrical tappet head, a key groove is formed in an outer side surface of the cylindrical tappet head, a guide woodruff key is arranged in the key groove, and the guide woodruff key is connected with the tappet guide cylinder.

2. The sensor for measuring cam and tappet contact force of an engine according to claim 1, wherein the small hemispherical groove in the tappet head is designed at a lowest point of the large arc-shaped groove, four countersunk holes which are uniformly distributed at intervals in the circumferential direction are designed in the large arc-shaped groove, and the three wire outlet holes are uniformly formed in the position, close to the inner wall, of the upper end face of the tappet head at the interval of 20 degrees.

3. The sensor for measuring cam and tappet contact force of an engine according to claim 1, wherein a force transmission threaded hole is formed in one end face of the force carrying element; and one end face of the force transmission element is provided with a force transmission bolt which is matched with the force transmission threaded hole of the force carrying element.

4. The sensor for measuring cam and tappet contact force of an engine according to claim 2, wherein a force transmission threaded hole is formed in one end face of the force carrying element; and one end face of the force transmission element is provided with a force transmission bolt which is matched with the force transmission threaded hole of the force carrying element.

5. The sensor for measuring cam and tappet contact force of an engine according to claim 3, wherein four threaded holes are uniformly formed at intervals in the other end face of the force transmission element in the circumferential direction; the piezoelectric element is an annular sensitive element made of piezoelectric crystals; and four through holes which are uniformly distributed at intervals in the circumferential direction are formed in the force bearing element, and four countersunk bolts are connected with the tappet head, the force bearing element and the force transmission element through the countersunk holes, the through holes and the threaded holes.

6. The sensor for measuring cam and tappet contact force of an engine according to claim 4, wherein four threaded holes are uniformly formed at intervals in the other end face of the force transmission element in the circumferential direction; the piezoelectric element is an annular sensitive element made of piezoelectric crystals; and four through holes which are uniformly distributed at intervals in the circumferential direction are formed in the force bearing element, and four countersunk bolts are connected with the tappet head, the force bearing element and the force transmission element through the countersunk holes, the through holes and the threaded holes.

7. The sensor for measuring cam and tappet contact force of an engine according to claim 1, wherein leads connected with the piezoelectric element are led out through the wire outlet holes and are connected with an external data acquisition and processing system.

8. The sensor for measuring cam and tappet contact force of an engine according to claim 5, wherein leads connected with the piezoelectric element are led out through the wire outlet holes and are connected with an external data acquisition and processing system.

9. The sensor for measuring cam and tappet contact force of an engine according to claim 6, wherein leads connected with the piezoelectric element are led out through the wire outlet holes and are connected with an external data acquisition and processing system.

10. The sensor for measuring cam and tappet contact force of an engine according to claim 7, wherein the data acquisition and processing system comprises a charge amplifier and a data acquisition instrument.

11. The sensor for measuring cam and tappet contact force of an engine according to claim 8, wherein the data acquisition and processing system comprises a charge amplifier and a data acquisition instrument.

12. The sensor for measuring cam and tappet contact force of an engine according to claim 9, wherein the data acquisition and processing system comprises a charge amplifier and a data acquisition instrument.

13. A method for measuring cam and tappet contact force comprising the following steps:

step one, dismantling a tested tappet;

step two, installing the sensor according to claim 10 in the tappet guide cylinder, and installing the guide woodruff key to prevent the sensor from rotating;

step three, installing the push rod between the sensor and a rocker arm, and placing a ball head of the push rod in the small hemispherical groove in the head of the push rod of the sensor;

step four, connecting the leads, and setting parameters of data acquisition and processing system; and step five, starting a reversed towing motor, adjusting the different rotating speeds of the reversed towing motor, and transmitting load to the sensor by the cam, wherein charges are generated on the surface of the piezoelectric element after the piezoelectric element is subjected to impact force, and the charges become voltage proportional to external force to be output after amplification of a charge amplifier and impedance change of a measuring circuit, so that a magnitude of the cam and tappet contact force in a normal direction, a tangetial direction and an axial direction of a contact surface of the cam and the sensor is obtained.

* * * * *